US012767204B2

(12) United States Patent
Zurwesten et al.

(10) Patent No.: US 12,767,204 B2
(45) Date of Patent: Oct. 20, 2026

(54) CHILD TRANSPORT DEVICE SYSTEM

(71) Applicant: CYBEX GmbH, Bayreuth (DE)

(72) Inventors: Johannes Zurwesten, Bayreuth (DE); Ralf Holleis, Bayreuth (DE)

(73) Assignee: CYBEX GmbH, Bayreuth (DE)

( * ) Notice: Subject to any disclaimer, the term of this patent is extended or adjusted under 35 U.S.C. 154(b) by 308 days.

(21) Appl. No.: 18/546,406

(22) PCT Filed: Feb. 15, 2022

(86) PCT No.: PCT/EP2022/053607
§ 371 (c)(1),
(2) Date: Aug. 14, 2023

(87) PCT Pub. No.: WO2022/171888
PCT Pub. Date: Aug. 18, 2022

(65) Prior Publication Data

US 2024/0132135 A1 Apr. 25, 2024
US 2024/0227906 A9 Jul. 11, 2024

(30) Foreign Application Priority Data

Feb. 15, 2021 (DE) ..................... 20 2021 100 743.5

(51) Int. Cl.
*B62B 7/12* (2006.01)
*B62B 19/04* (2006.01)
(Continued)

(52) U.S. Cl.
CPC .............. *B62B 7/126* (2013.01); *B62B 19/04* (2013.01); *B62K 27/003* (2013.01); *B62K 27/12* (2013.01)

(58) Field of Classification Search
CPC ....... B62B 7/126; B62B 19/04; B62B 5/0079; B62B 2206/06; B62B 7/046; B62B 7/12; B62K 27/003; B62K 27/12
See application file for complete search history.

(56) References Cited

U.S. PATENT DOCUMENTS 5,421,597 A * 6/1995 Berner ...................... B62B 7/10 280/415.1
5,454,577 A * 10/1995 Bell .......................... B62B 3/02 280/643

(Continued)

FOREIGN PATENT DOCUMENTS

CA 2208809 C 5/2009
CN 207128969 3/2018

(Continued)

OTHER PUBLICATIONS

"International Application No. PCT/EP2022/053607, International Search Report and Written Opinion mailed May 19, 2022", (May 19, 2022), 13 pgs.

(Continued)

*Primary Examiner* — James A Shriver, II
*Assistant Examiner* — Ian Bryce Shelton
(74) *Attorney, Agent, or Firm* — Schwegman Lundberg & Woessner, P.A.

(57) ABSTRACT

A child transport device system, such as a pram or child trailer or jogger system, for use in different modes, for pushing or pulling transport of at least one child, comprising a child receiving device for receiving the at least one child, which is adjustable in at least two configurations, and at least one connection device, which is connectable to the child receiving device in at least one of the configurations of the child receiving device and is not connectable or is connectable only in an impeded manner to the child receiving device in at least one further configuration of the child receiving device.

16 Claims, 5 Drawing Sheets

Figure 1:
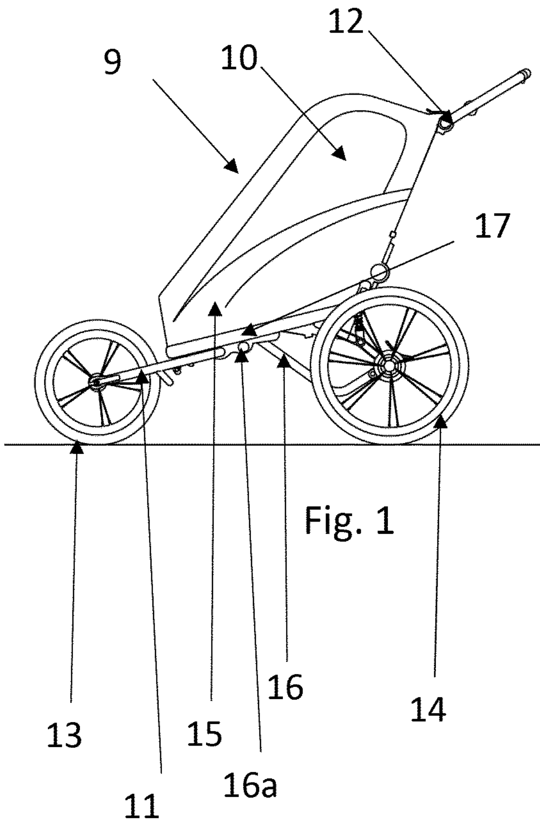

(51) Int. Cl.
*B62K 27/00* (2006.01)
*B62K 27/12* (2006.01)

(56) References Cited

U.S. PATENT DOCUMENTS

| | | | | |
|---|---|---|---|---|
| 6,443,467 | B1 * | 9/2002 | Black | B62B 7/046 280/47.38 |
| 7,341,265 | B1 * | 3/2008 | Liu | B62K 27/12 280/204 |
| D633,825 | S * | 3/2011 | van Leeuwen | B62K 27/12 D12/101 |
| 8,006,992 | B2 * | 8/2011 | Britton | B62K 27/02 280/647 |
| 8,262,103 | B2 | 9/2012 | Enserink et al. | |
| 9,669,859 | B2 * | 6/2017 | Hansen | B62B 7/044 |
| 9,889,872 | B2 * | 2/2018 | Somerset | B62B 9/14 |
| 9,908,552 | B2 * | 3/2018 | Fleming | B62B 7/10 |
| 10,442,452 | B2 * | 10/2019 | Fleming | B62B 7/126 |
| 2002/0096857 | A1 * | 7/2002 | Valdez | B62K 27/02 280/504 |
| 2006/0108766 | A1 * | 5/2006 | Staszak | B62K 27/02 280/204 |
| 2008/0067787 | A1 * | 3/2008 | Britton | B62B 7/126 280/643 |
| 2008/0143076 | A1 * | 6/2008 | Klevana | B62B 7/062 280/402 |
| 2012/0013082 | A1 * | 1/2012 | Pendl | B62D 63/064 29/401.1 |
| 2013/0069327 | A1 * | 3/2013 | Tran | B62B 7/14 280/47.39 |
| 2015/0291202 | A1 * | 10/2015 | Love | B62B 19/02 280/845 |
| 2016/0144880 | A1 * | 5/2016 | Hansen | B62B 7/044 280/648 |
| 2016/0347343 | A1 * | 12/2016 | Weber | B62K 27/003 |
| 2017/0274919 | A1 * | 9/2017 | Somerset | B62B 7/12 |
| 2017/0341671 | A1 * | 11/2017 | Fleming | B62K 27/02 |
| 2017/0361860 | A1 * | 12/2017 | Fleming | B62B 7/126 |

FOREIGN PATENT DOCUMENTS

| | | | | |
|---|---|---|---|---|
| DE | 102005029448 | A1 * | 1/2007 | B62B 9/203 |
| DE | 202017002773 | U1 * | 8/2017 | B62K 27/003 |
| EP | 2719604 | A1 * | 4/2014 | B62B 9/24 |
| WO | WO-2022171888 | A1 | 8/2022 | |

OTHER PUBLICATIONS

"International Application No. PCT EP2022 053607, English Translation of International Preliminary Report on Patentability", Aug. 24, 2023, 8 pgs.
"Chinese Application No. 202280021389.0, Office Action dated Feb. 28, 2026", w English Translation, Feb. 28, 2026, 19 pgs.

* cited by examiner

CHILD TRANSPORT DEVICE SYSTEM

PRIORITY CLAIM TO RELATED APPLICATIONS

This application is a U.S. national stage filing under 35 U.S.C. § 371 from International Application No. PCT/EP2022/053607, filed on 15 Feb. 2022, and published as WO2022/171888 on 18 Aug. 2022, which claims the benefit under 35 U.S.C. 119 to German Application No. 20 2021 100 743.5, filed on 15 Feb. 2021, the benefit of priority of each of which is claimed herein, and which applications and publication are hereby incorporated herein by reference in their entirety.

The invention relates to a child transport device system, preferably a pram and/or child trailer and/or jogger system, which can be used in various modes and is configured in particular for pushing and/or pulling transport of at least one child. Furthermore, the invention relates to a method for configuring a child transport device using the child transport device system.

Devices for transporting children, in particular prams, joggers and child trailers are known in the prior art. Such transport devices can sometimes be operated in different modes. Depending on the user's wish, a main body of the transport device (in which at least one child is accommodated) can be pulled or pushed. In each case, different application purposes are possible, for example a use of the transport device when jogging, cycling, skiing (cross-country skiing) and/or normal walking, for example going for a walk. A jogger is to be understood in particular as a pram that is configured such that it can be used for sporty running (jogging), possibly also on uneven terrain.

Depending on the application purpose or desired design or set-up of the transport device, different connection devices (connection elements, e.g. a coupling device, such as a pull bar) may be necessary to enable a locomotion as practical and comfortable as possible for the user and the child. For example, when cycling, a pull bar is commonly used which connects the bicycle to the main body of the transport device (or the trailer). For jogging, a pull bar may also be used, which, however, may be designed differently and may have more suspension than a pull bar used for cycling, for example due to running movements. In cross-country skiing, again, a longer pull bar may be necessary (or at least advantageous) in order to ensure a distance between the cross-country skier to the main body of the transport device (in which the child is received) so that the skis do not come into contact with the main body during cross-country skiing.

Often, when pulling the main body (or the transport device), a front wheel (possibly two or even more front wheels) provided at a connection region of the main body for the pushing locomotion of the child transport device is replaced by a pull bar or other pull transmission device. In this case, a connection region can be provided on the main body so that, depending on the application purpose, various connection devices (connection elements) such as, for example, one or more pull bar(s) or a front wheel fork can be attached. The pushing of a transport device (i.e. for example when walking or also when jogging) is usually accomplished via a pusher, whereby at least one front wheel and/or at least one front wheel fork can then be connected to the connection region, if applicable.

Depending on the intended use, it is generally desirable not only to connect the main body to a corresponding connection device, but to configure the main body itself with regard to the intended use. CA 2 208 809 C shows, for example, a child transport device system that can be used for various application purposes. In order to use the transport device as a trailer, a pulling device can be connected to a connection region. If the child transport device is to be pushed, a front wheel can be attached to the connection region instead of the pulling device. However, the main body in which the child is accommodated is not modified per se here. This results in the disadvantage that the child transport device is either designed in such a way that there is a comparatively high risk to the child's health (for example, if the centre of gravity of the child transport device is comparatively high) or, especially when pushing the child transport device, there is only a low level of comfort for the child and/or the user (for example, if the child transport device is designed to be comparatively low or with a comparatively low centre of gravity).

U.S. Pat. No. 8,262,103 B2 shows a child transport device system that can be converted between a first setting as a pushable buggy and a second setting as a pulled trailer. The wheels can be adjusted so that a centre of gravity in the first setting is higher above the ground than in the second setting. Thus, the main body of the child transport device system can be adjusted to different heights. However, from a safety point of view, this solution is not yet considered satisfactory.

It is therefore object of the invention to propose a child transport device system in which a comparatively high level of safety for the child can be achieved in a comparatively simple manner. In addition, the system should be comfortable in its use. Furthermore, it is an object of the invention to propose a corresponding method for configuring a child transport device.

The object is solved in particular by the features of claim 1.

In particular, the object is solved by a child transport device system, preferably pram and/or child trailer and/or jogger system (in particular for use in different modes, in particular for pushing and/or pulling transport of at least one child, i.e. exactly one child or exactly two children or more than two children), comprising: a child receiving device (or main body) for receiving the at least one child, which can be set in at least two configurations, as well as at least one, preferably at least two, connection device(s) which (each) can be (detachably) are connectable to the child receiving device in at least one of the configurations of the child receiving device, wherein the connection device or at least one of the connection devices in at least one configuration of the child receiving device is not connectable or connectable only in an impeded manner to the child receiving device (i.e. a corresponding connection possibility which is basically available is then at least partially blocked in the respective configuration). Preferably, a further one of the connection devices can be connected to the child receiving device in the corresponding configuration.

Insofar as in the following reference is made to "a connection device", this may refer both to the above-mentioned "one connection device" as well as to the "further connection device", unless otherwise explicitly stated.

One idea of the invention is to prevent, for at least one connection device, a connection to the child receiving device in at least one, i.e. exactly one or more than one, (but not every) configuration. In principle, therefore, a connection (in at least one further configuration) is nevertheless possible. In this way, it can be prevented or at least impeded from the outset (e.g. on the part of the manufacturer) that a particular connection device is usable at all in a (e.g.

unfavourable, in particular unsafe for the corresponding application purpose) configuration of the child-receiving device.

By a connection (or a corresponding connectability) it is to be understood that the corresponding connection device can be connected to the child receiving device in such a way that the connection device is usable for its intended use (for example, a pull transmission device can be subjected to pull or a ground contact device, such as a wheel, is configured to support the child receiving device). In this respect, a connection may be characterised in that there is a positive and/or frictional connection between the connection device and the child receiving device (for which purpose connection means may be provided either on the child receiving device and/or the connection device and/or additional connection means may still be provided).

By impeding the connection it is preferably to be understood that the connection is at least not made possible in the same way as in a constellation in which the connection is not impeded. For example, a connection structure of the child receiving device may be partially or completely covered in the case of an impeded connection option (compared to the non-impeded connection option) and/or in the case of an impeded connection option, an additional actuation (for example of a further, possibly adjustable blocking device, for example manually adjustable, blocking device) may possibly be required, which does not have to be actuated in the case of the non-impeded connection option. Such an actuating device may be at least partially concealed and/or be formed not visible from the outside.

It has been recognised that in the prior art (for example U.S. Pat. No. 8,262,103 B2) it can easily happen that the user (consciously or unconsciously) neglects to adjust the child transport device to the appropriate use (in the case of U.S. Pat. No. 8,262,103 B2, as a pushable buggy or as a pulled trailer). For example, in the prior art it is possible in an easy manner to configure the child transport device as a trailer to be pulled, although even in this case the centre of gravity may be set comparatively high (with corresponding risks at higher speeds, in particular when cycling).

For example, comparatively high speeds can occur when pulling the child transport device. Furthermore, especially when using a pull transmission device (pull bar), a greater distance to the child receiving device may be necessary (compared to a configuration for pushing), so that also for this reason a comparatively low centre of gravity of the child receiving device (compared to a configuration for pushing) may be desired in order to prevent the child transport device from tipping over. In this respect, a change in the centre of gravity is advantageous in this case in order to ensure the desired stability and safety during use. A centre of gravity that is too high (above the ground) and a tipping over of the child transport device possibly caused by that, for example when using a pull bar, can lead to serious accidents. For a pushing locomotion, on the other hand, a slightly higher centre of gravity is (usually) more comfortable for the user and/or the child, and does not pose any particularly high risks due to rather moderate speeds.

The child receiving device preferably forms a main body of a (concretely present) child transport device, comprising the child receiving device and at least one (i.e. exactly one or more than one) connection device (in the connected state). In this state, the child receiving device may constitute at least 60% by weight, preferably at least 80% by weight or 90% by weight of the entire child transport device. The child receiving device may comprise at least one (i.e. exactly one or more than one) seat and/or reclining surface for the respective child or the respective children. For example, a (respective) seating surface may comprise a seat portion (for receiving the legs' undersides and/or the buttocks of the child) and a back portion (for receiving the back of the child). The seat and/or reclining surface may also be formed by a hammock, for example.

The child receiving device may have a weight of at least 5 kg or at least 10 kg and/or at most 35 kg or at most 20 kg or at most 15 kg.

Preferably, in the at least one configuration in which at least one connection device is not connectable or is connectable only in an impeded manner to the child receiving device, at least one further connection device is connectable to the child receiving device.

In embodiments, a transfer from the at least one configuration in which the at least one connection device is connectable to the at least one further configuration in which the at least one connection device is not connectable or is connectable only in an impeded manner is not possible when the at least one connection device (11) is connected (in particular blocked by the at least one connection device).

In embodiments, at least one connection structure of the child receiving device, to which at least one connection device is connectable, may be arranged in a front and/or lower region of the child receiving device.

In principle, the front end of the child receiving device shall be that end which is in front with respect to the normal direction of travel and/or that end in the direction of which the child faces when accommodated in the child receiving device. However, it can also be understood as that end facing towards a pulling person (for example a pulling cyclist). The rear end may be that end which (in an appropriate configuration) faces a pushing person.

A front region is in particular an region that includes or is adjacent to the front end. Preferably, the front region shall extend over at most half of a length of the child receiving device (from front to rear), preferably at most 30% or at most 15% of this length and/or at least 1% of this length. This is intended to apply to at least one (i.e. exactly one or more than one) configuration of the child receiving device, preferably to all configurations (so that, for example, a front region that is within the foremost 50% of the length is a region where this applies to all configurations).

A lower region is, in particular, a region that includes or adjoins a lowermost point. Preferably, the lower region is intended to extend over at most half of a height of the child receiving device (from bottom to top), preferably at most 30% or at most 15% of that height and/or at least 5% of that height. This is intended to be true for at least one (i.e. exactly one or more than one) configuration of the child receiving device, preferably for all configurations (so that, for example, a lower region that is within the lowest 50% of the height is a region where this is true for all configurations).

The child transport device system may comprise (preferably in any mode) at least one ground contact device, preferably at least one wheel and/or at least one skid.

In particular, the child receiving device may comprise at least one ground contact device, preferably at least one wheel, in particular at least one rear wheel and/or at least one skid. Alternatively or additionally, at least one connection device may comprise at least one ground contact device, preferably at least one (i.e. exactly one or more than one) wheel and/or at least one (i.e. exactly one or more than one) skid, preferably comprise a front wheel and/or a front fork or be formed by such.

At least one connection device (in particular at least one connection device provided in addition to or as an alternative to a connection device with at least one ground contact device) may comprise or be formed by a pull transmission device, in particular a pull bar.

In principle, it may be possible that at least two (different) connection devices (with different configurations) are connected to the child receiving device at the same time.

It is possible that at least two (different) connection devices are not simultaneously connectable or attachable to the child receiving device (in at least one configuration, possibly in several or all configurations of the child receiving device).

A configuration of the child receiving device may describe a state that concerns a setting that (directly) affects the functionality of the child receiving device. By this in turn it is to be understood in particular that configurations may differ, for example, by a geometric dimensioning (e.g. height, width and/or length) (related to the child receiving device as a whole or a component thereof, such as an arrangement and/or positioning and/or orientation of a reclining/seating surface for the child within the child receiving device). Two configurations may differ, for example, in that a ground contact device allows support on the ground in one configuration and does not (or only to a lesser extent) in the other configuration, for example when the ground contact device (e.g. the wheel) is pivoted and/or (translationally) displaced in such a way that it no longer allows (substantial) support. Under a configuration, in particular, a configuration is to be understood in which the child receiving device is prepared for its intended use (in particular, a child can be received and transported). A (pure) storage and/or transport position (e.g. a folded state and/or disassembled state) is in particular not to be understood as a corresponding configuration of the child receiving device.

Different configurations may differ in particular in how the child receiving device behaves during the locomotion and/or how the child receiving device receives the at least one child and/or how the child receiving device is operable by the person operating it (i.e. for example how high handles and/or a pusher or the like are positioned). Other changes, such as a movement of a locking device and/or a rotation of a wheel, which in this respect do not fundamentally affect the behaviour of the child receiving device, are in particular not to be understood as a change of configuration. If, for example, a latch has to be moved in order to change a configuration, the movement of the latch per se should not yet be understood as a change of configuration.

In particular, a change in configuration is said to occur when a component weighing at least 200 g or at least 500 g or at least 2 kg is moved translationally and/or rotationally relative to another component of the child receiving device weighing at least 200 g or at least 500 g or at least 2 kg (although the rolling of wheels may in principle be excluded from consideration here). A corresponding (relative) translation can be at least 1 cm or at least 5 cm and/or at most 50 cm. A (relative) rotation may be at least 1 degree or at least 5 degrees or at least 20 degrees and/or at most 180 degrees or at most 90 degrees or at most 45 degrees.

The various configurations of the child receiving device are in particular configurations in which the child receiving device consists at least substantially of the same components.

In embodiments, at least two of the configurations may differ by: a height (of the highest point) of the child receiving device and/or a height of a centre of gravity of the child receiving device. differ distinguished by a height (of a highest point) of a component of the child receiving device and/or a centre of gravity of such a component, in particular a height of a highest and/or lowest and/or middle point of a child receiving surface and/or a component thereof. Alternatively or additionally, at least two of the configurations may differ by a height (or highest and/or lowest and/or middle point) of a pusher and/or a component thereof.

Alternatively or additionally, at least two configurations may differ by a height of at least one wheel axle and/or by different relative positions of a wheel axle with respect to a child receiving surface.

Alternatively or additionally, at least two configurations may differ by a length and/or width of the child receiving device and/or a component thereof, in particular a wheelbase and/or a track width.

Alternatively or additionally, at least two configurations may differ by a pusher configuration of a pusher or pusher component. Two pusher configurations may in particular differ by an angle of the pusher with respect to a main body of the child receiving device and/or an angle of two components of the pusher with respect to each other and/or by a pusher length and/or a pusher height (respectively of a highest and/or middle and/or lowest point of the pusher).

Preferably, an (adjustable) blocking device is provided for preventing (or at least impeding) the connection of at least one of the connection devices in at least one configuration. The blocking device is preferably in (direct or indirect) operative connection with a mechanism for changing the configuration of the child receiving device. The operative connection is preferably mechanical, but may alternatively or additionally be electrical and/or electronic and/or designed in still other ways. In general, a change in the configuration may cause (possibly without that being preventable by the user) that also the blocking device changes its position (in particular changes from a blocking state to a non-blocking state or vice versa).

In embodiments, the blocking device can modify at least one connection structure of the child receiving device such that the (respective; at least one) connection device is not connectable or is connectable only in an impeded manner via this connection structure. Alternatively (or additionally, for example concerning a further connection structure), the (respective) blocking device can enable a blocking independent of the provided connection structure(s), in particular in the sense that the connection structures per se are not modified, for example are not modified with regard to their geometry. In such a case, the (respective) blocking device could, for example, abut against (or stand in the way of) another portion of the (respective) connection device that is not (or cannot be) in engagement with a corresponding connection structure of the child receiving device.

The blocking device may, in at least one configuration of the child receiving device, prevent or impede the connection of at least one connection device and allow the connection of at least one other connection device. In at least one other configuration, the blocking device may prevent or impede the connection of none or (alternatively) at least the further connection device.

The connection device may be single or multi-piece, or may comprise one or more sections of an element (for example, of the child receiving device).

In embodiments, the blocking device may comprise a protrusion and/or pin (or the like) that can penetrate (relatively speaking) and/or be (at least partially) removed again from a recess (for example, a connection structure of the child receiving device comprising a through-hole). Specifically, the projection (or pin and/or bar and/or the like) can be moved for this purpose, or the corresponding recess, or both. It is also possible that at least one connection device has a recess (as a connection counter-structure) which can be brought into engagement with a corresponding projection and/or pin (and/or the like) on the child receiving device (as a corresponding connection structure), wherein the blocking device is then configured, for example, such that it enlarges the projection and/or pin (and/or the like) in at least one direction in such a way that the recess of the connection device can no longer be brought into engagement with the projection (or pin or the like structure).

The child receiving device may comprise at least one seating and/or reclining device. Alternatively or additionally, the child receiving device may comprise at least one cabin (for example with a roof and/or at least two, possibly four, side walls) for receiving at least one child. Alternatively or additionally, the child receiving device may comprise at least one frame which is preferably adjustable for setting different configurations (for example in that individual frame components are translationally and/or rotationally movable against each other).

The child carrier system is preferably configurable for at least two different applications. The applications may preferably differ in that the system is configured either for pulling (as an example of a first application), preferably via a vehicle, preferably a bicycle, and/or via a pulling harness, or for pushing (as an example of a second application), preferably by a walking and/or running person.

At least two of the connection devices may differ. Preferably, at least two connection devices differ in that at least one connection device comprises at least one ground contact device, at least one wheel, preferably front wheel, and/or at least one skid, and/or comprises at least one fastening device for fastening such a ground contact device, and at least one connection device does not.

Alternatively or additionally, at least two of the connection means may differ by a number of connection counter-structures (on the respective connection device) for connecting to at least one connection structure of the child receiving means.

Alternatively or additionally, at least two connection devices may differ by a material (at least in sections) and/or a length and/or a height and/or a width and/or a weight.

The respective connection device may comprise at least one connection counter-structure (in particular as already mentioned above) for connecting to at least one connection structure of the child receiving device. Preferably, at least one of the connection counter-structure and the connection structure comprise at least one recess and/or at least one opening and/or at least one gap into which at least one protrusion and/or at least one pin and/or at least one clamp of the other of the connection counter-structure and the connection structure can be engaged. Alternatively or additionally, it is also conceivable that both the connection structure as well as the connection counter-structure have protrusions, for example hook-shaped, geometries which can be brought into engagement with one another.

A suitable recess or opening or a suitable gap and/or a suitable protrusion or pin or clamp and/or hook may have a cross-sectional dimension in at least one direction of at least 0.5 cm or at least 1.5 cm or at least 2.5 cm and/or of at most 15 cm or at most 10 cm or at most 8 cm.

In embodiments, a connection of at least one (preferably several or all) connection device(s) to the child receiving device is lockable, in particular such that the connection can only be released by actuating a locking device via an actuating device, for example comprising a button, knob, slider and/or lever. Preferably, the locking takes place “automatically” when the connection structure and the connection counter-structure are engaged, i.e. without any additional operation by the user, e.g. by a (spring-loaded) latching or snapping mechanism.

The above-mentioned object is further solved by a method for configuring a child transport device using a child transport device system of the above type, wherein the connection device or—at least one (i.e. exactly one or more than one) of the connection devices is connected to the child receiving device. Preferably, a single one (or a sub-group) of the connection devices is selected and connected to the child receiving device. Where appropriate, the method may comprise a (preceding) step of configuring the child receiving device (i.e. in particular a step of bringing it into a configuration in which the respective connection device is connectable, in particular starting from a configuration in which this is not the case). In further procedural embodiments, the functions and/or uses and/or applications explained above and/or below can each be carried out individually and/or in any combination as specific procedural steps.

A (in particular the above) frame of the child receiving device can have different frame region. One (in particular upper) frame region may be configured to hold a cabin. One, possibly further, (in particular lower) frame region may be configured for setting at least two configurations, in particular a first configuration with low centre of gravity (low configuration) and a second configuration with high centre of gravity (high configuration). The further (lower) frame region can preferably be pivotably mounted, in particular pivotably on the first-mentioned (upper) frame region. One, possibly further, (in particular front) frame region may have a connection structure (for connecting at least one connection device).

The child transport device system can be designed for use for a first application purpose as a child trailer, in particular as a rickshaw, if the child receiving device is set in a certain (for example the above-mentioned, first) configuration (wherein the first configuration can also be understood here in general terms as a configuration with a low centre of gravity of the child receiving device). The child trailer can then be pulled, for example, by human power, in particular by running, walking and/or by a vehicle, in particular a bicycle. For this purpose, the child trailer may have at least one pulling device (for example, a pulling arm and/or a pull bar).

Basically, a distinction can be made in particular between a pull jogger and a bicycle trailer. In the case of a pull jogger, for example, a (at least in sections rigid) connection device (connection element or pulling device) can be attached to the child receiving device at one end. At another end, the connection device may have a harness that may be attachable to a person. A bicycle trailer may have a (in sections rigid) connection element attached at one end to the child receiving device but at the other end to the bicycle, for example via a coupling device.

By a rigid connection element shall be understood in particular a connection element with a material that in principle retains its shape (at least substantially) in normal use. For example, the material may have a modulus of elasticity of at least 1 GPa, optionally at least 10 GPa or at least 50 GPa and/or at most 400 GPa. If the connection element consist of a plurality of materials, the corresponding limit values shall preferably be satisfied for all materials or at least for materials which in total constitute at least 90% or at least 99% by weight. Alternatively or additionally, under a rigid connection element may be understood that the connection element can expand and/or contract in the direction of movement by a maximum of 10%, preferably a maximum of 5%, of its length, so that the distance between the user and the child transport device remains at least substantially the same and can vary only within said range.

The child transport device may be configured for use of at least one further (e.g. second of at least two application purposes) as a (in particular pushable) pram, for example when the child receiving device is set in a comparatively high configuration (in particular with a comparatively high centre of gravity).

The pram may (in particular in the case of the preceding paragraph) have at least three ground contact elements. In particular, the pram may have at least one, preferably two, rear wheel/rear wheels and/or at least one front wheel, preferably exactly one front wheel or exactly two front wheels. The at least one rear wheel may preferably be the at least one wheel also present in the low configuration (with for example a low centre of gravity), or in general wheels (also) fitted in a lower configuration (in particular a configuration with a low centre of gravity).

The (pushable) pram may in particular comprise a pusher. Preferably, the (pushable) pram may be a jogger, i.e. a pram which is suitable for sporting activities due to its characteristics, such as its large wheels. A jogger can preferably have exactly one, in particular comparatively large, front wheel. Alternatively or additionally, the pram may be or can be designed with two, in particular comparatively small, front wheels.

A transfer between at least two application purposes (or configurations of the child transport device as a whole) may comprise (as an adjustment step) the removal and/or attachment of (in particular for the respective application purpose specific) connection device(s) to a connection region (corresponding connection structures) of the child receiving device (and possibly still further adjustment steps).

In a specific embodiment, the first connection device is a pull transmission device (in particular a pull bar) and the second connection device is a connection device comprising at least one wheel, in particular a fork with a wheel, preferably with a front wheel.

In general, a connection region of the child receiving device can have different connection structures (engagement structures), which can be provided for attaching different connection devices. Alternatively or additionally, the same connection structures (engagement structures) provided in a connection region of the child receiving device may be provided for all connection devices or a sub-group of several connection devices. In embodiments, at least one engagement structure (connection structure) of the connection region of the child receiving device may be used for all (or at least several) connection devices, while at least one further connection structure of the connection region (of the child receiving device) is only used for at least one selected connection device (but not for all connection devices).

A (in particular the above) connection region of the child receiving device may in particular comprise at least one first engagement structure (such as, for example, an opening and/or a counter-structure designed to engage with an opening). The (respective) connection device may comprise at least one second engagement structure (or connection counter-structure, for example at least one counterpart designed to engage with at least one opening, and/or at least one opening), which may preferably be designed as a counterpart to at least one first engagement structure of the at least one connection region (and in particular for positive cooperation) to enable fastening (or connection). Preferably, for (releasably) fastening a connection means to the child receiving device, either the at least one connection structure (first engagement structure) can engage the corresponding connection counter-structure (second structure), and/or vice versa.

If certain first engagement structures (connection structures) in the connection region and certain second engagement structures (connection counter-structures) on the (respective) connection device are described here, above and below, this is also intended to explicitly cover (and hereby disclose) solutions in which the described connection counter-structure (second engagement structure) is provided in the connection region and the first engagement structure (connection structure) is provided on the connection device. The (respective) connection device is preferably a connection element or a connector.

A connection operation via the respective connection or engagement structures may comprise a rotation and/or a translation of the respective structures (with respect to each other).

For example, the first and/or second engagement structure may be an arm that may engage a mating structure formed as an opening or also comprising a (for example hook-shaped) arm.

In embodiments, the connection region (of the child receiving device) may have at least two openings, wherein at least two connection devices may be designed differently. An opening may be understood to be a through hole and/or blind hole, but also another type of opening such as a groove (or the like).

Different configurations of the child receiving device may differ, for example, in terms of safety aspects (for example, a tilt stability) and/or comfort aspects.

In a particularly preferred embodiment, two configurations of the child receiving device differ by a position (height) of the centre of gravity. In particular, in this respect, one configuration may be characterised by a high mode and a further configuration by a low mode.

A centre of gravity can be adjusted, for example, by adjusting a (the above) frame. This can be done, for example, by pivoting a frame region to which the wheels are fastened (for example, a lower frame portion) about another (for example, rear or upper) frame region.

Alternatively or additionally, also a wheel (in particular a rear wheel) can be displaced (for example, shifted and/or repositioned) relative to a main body of the child receiving device (in particular a frame thereof) in such a way that it is transferred from a higher to a lower position (or vice versa). Specifically, the (respective) wheel (rear wheel) can be fastened (and/or locked) in at least two different heights relative to the frame.

Several configurations of the child receiving device may also differ by a number of wheels which are connected to the child receiving device and/or by a number of wheels which are connected to the child receiving device such as to enable a supporting function (in particular locomotion).

Different configurations of the child-carrier can also be realised by defining a first configuration by a wide mode and a second configuration by a narrow mode (in that the child receiving device is dimensioned smaller in the lateral direction, in particular in a global view or in relation to a maximum width).

In any case, upon a change of the configuration a change of the frame does not necessarily have to happen. A change of a pusher (pusher setting) can also distinguish two configurations from each other, for example a change between the setting of the pusher as a classic pusher when the child transport device is used as a pram (in particular a jogger) and the use of the pusher as a roll bar when the child transport device is used as a trailer. The connection region of the child receiving device is preferably designed such that in at least one configuration only certain (or selected) connection devices are permitted for connection in order to prevent misuse as far as possible, so as to keep the safety risk for the child low.

This can be done, for example, by means of first engagement structures in the connection region, into which second engagement structures of the connection devices can engage. By engagement structures can be understood, among other things, openings, holes and/or grooves.

The restriction with regard to the possibility of connecting certain connection devices can preferably be effected by blocking the engagement of the respective engagement structures. Blocking can be understood to mean, among other things, a change in the cross-section of the first and/or second engagement structures. (A change in cross-section can also take place only in sections, without this always being specifically mentioned below). For this purpose, at least one first blocking means can be provided which, in a first position, does not influence the cross-section of the first engagement structures and, in a second position, influences the cross-section of at least one of the first engagement structures, in particular reduces or even completely fills it (preferably relating to an opening) or enlarges it (preferably relating to a counterpart designed to engage an opening). Alternatively or additionally, a covering of the first engagement structures (in particular openings) and/or the provision of at least one second blocking means is also possible, wherein the at least one second blocking means shall optionally not influence the cross-section of the engagement structures, but shall block another section of at least one connection device in a second position, in the sense that a relative movement between connection device and connection region which may be required for engagement between first and second engagement structures is blocked (and is not blocked in a first position of the at least one blocking means).

Specifically, a suitable element such as a latch and/or a pin and/or the like may be moved into and/or out of an opening, or a suitable element such as a latch and/or a pin and/or the like may be moved out of a counterpart designed to engage an opening, so that the cross-section changes in each case. Preferably, the suitable element may be moved through or along a surface which provides the positive engagement between the engagement structures.

In said alternative or additional embodiment, at least one suitable element such as a latch and/or a pin and/or the like may be moved in the connection region such that it/they do not block the movement necessary to engage the respective engagement structure (engagement element) in a first position and block it in a second position.

The movement of the suitable element may comprise a translation and/or a rotation.

Preferably, the engagement is lockable, for example by a latch and/or snap mechanism and/or any other suitable mechanism. In particular, this means that it should only be possible to disengage engaged engagement structures of the connection region and connection device when the interlock is released. For this purpose, for example, an actuating mechanism to be actuated by the user, in particular a push button, a slide button, a pulling element, a rotary knob, a lever and/or the like, may be provided.

Alternatively or in addition to the above-mentioned blocking via the first and/or second blocking means and/or by (at least partially) covering of engagement structures, it may also be provided to block the locking mechanism so that, even if engagement occurs, the engagement structures can (comparatively easily) be disengaged again. In particular for safety reasons, however, it is preferred if a blocking of the interlock occurs at most in addition to one of the other possibilities.

According to a preferred embodiment, each connection device can have at least two second engagement structures (in particular exactly two or exactly three second engagement structures) which are attached at a distance from one another. It is possible that different connection devices have different numbers of second engagement structures. The distance (or distances) between the (at least) two second engagement structures can vary for different connection devices.

The connection region (of the child receiving device) can then have, for example, at least two, in particular at least or exactly three first engagement structures, wherein the engagement of at least one of the first engagement structures with the corresponding second engagement structure of at least one connection device is blocked in at least one configuration. Preferably, therefore, the connection region in this embodiment has no or exactly one additional engagement structure relative to the respective connection device.

Depending on the configuration, the different connection devices can either be attached or, should the child receiving device be in a configuration that is not suitable for the application purpose, not be attached due to the blocking of the engagement.

Figure 11:
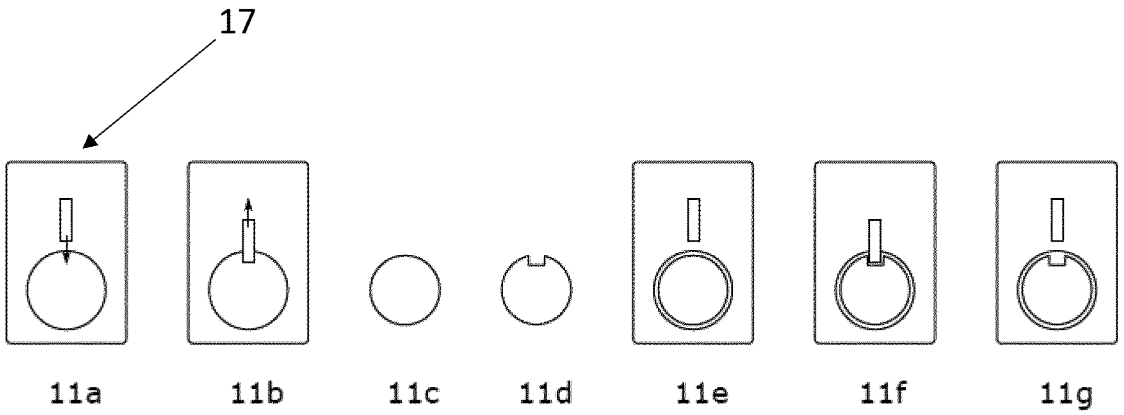
Figure 12:
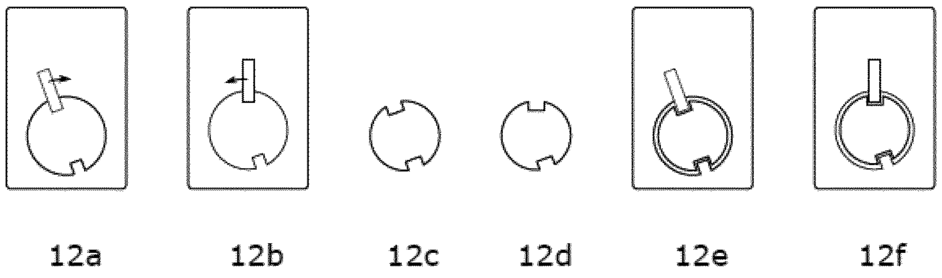

Further embodiments result from the figures and the corresponding descriptions. Without limiting generality, they comprise at least the following possibilities:

1. The connection region and each connection device each have exactly one engagement structure. A first engagement structure (engagement element) is associated with a first blocking means, so that in at least a first configuration of the child receiving device the first engagement structure (engagement element) has a different cross-section than in at least one second configuration of the child receiving device. At least one connection device is always connectable, while at least one other connection device is only connectable in one of the two configurations (cf. FIG. 11).
2. The connection region and each connection device each have exactly one engagement structure (engagement element). A first engagement structure (engagement element) is associated with a first blocking means, so that in at least a first configuration of the child receiving device the first engagement structure (engagement element) has a different cross-section than in at least one second configuration of the child receiving device. At least one connection device is connectable only in the first configuration of the child receiving device, while at least one other connection device is connectable only in the second configuration (cf. FIG. 12).
3. The connection region and each connection device each have exactly one engagement structure (engagement element). A second blocking means is associated with the connection region, which in a first position (which can be associated with the first configuration) does not block the connection of any connection device and in a second position (which can be associated with the second configuration) blocks the connection of at least one connection device. At least one connection device is always connectable, while at least one other connection device is only connectable in one of the two configurations. To achieve this, the at least one always connectable connection device is configured such that it does not have a portion that must pass through the space occupied by the second blocking means in its second position when connecting to the connection region, while the at least one connection device that is not always connectable has such a portion.

4. The connection region and each connection device each have exactly one engagement structure (engagement element). A second blocking means is associated with the connection region, which in a first position (which may be associated with the first configuration) blocks connection of at least one connection device and in a second position (which may be associated with the second configuration) blocks connection of at least one other connection device. At least the other connection device is connectable only in the first configuration of the main body, while at least the one connection device is connectable only in the second configurations.

Figure 13:
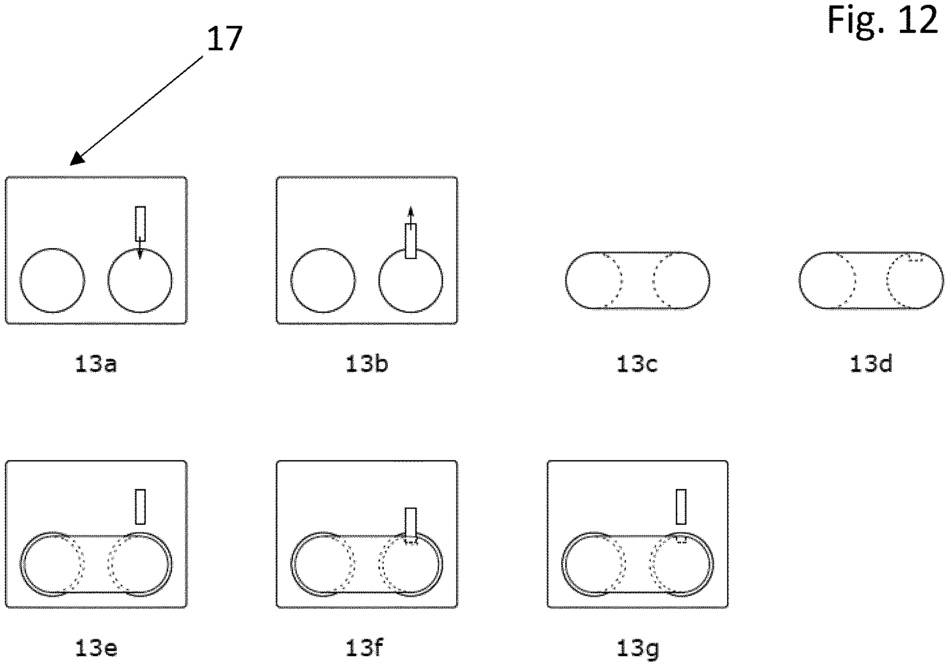
Figure 14:
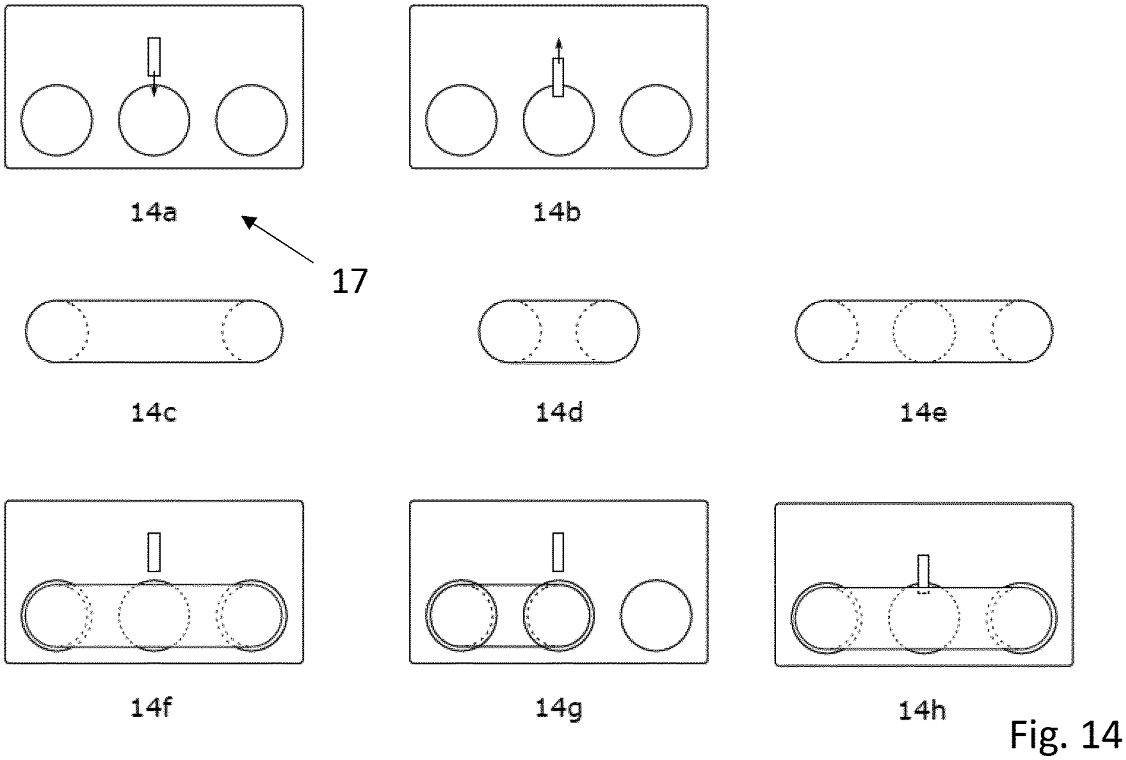
Figure 15:
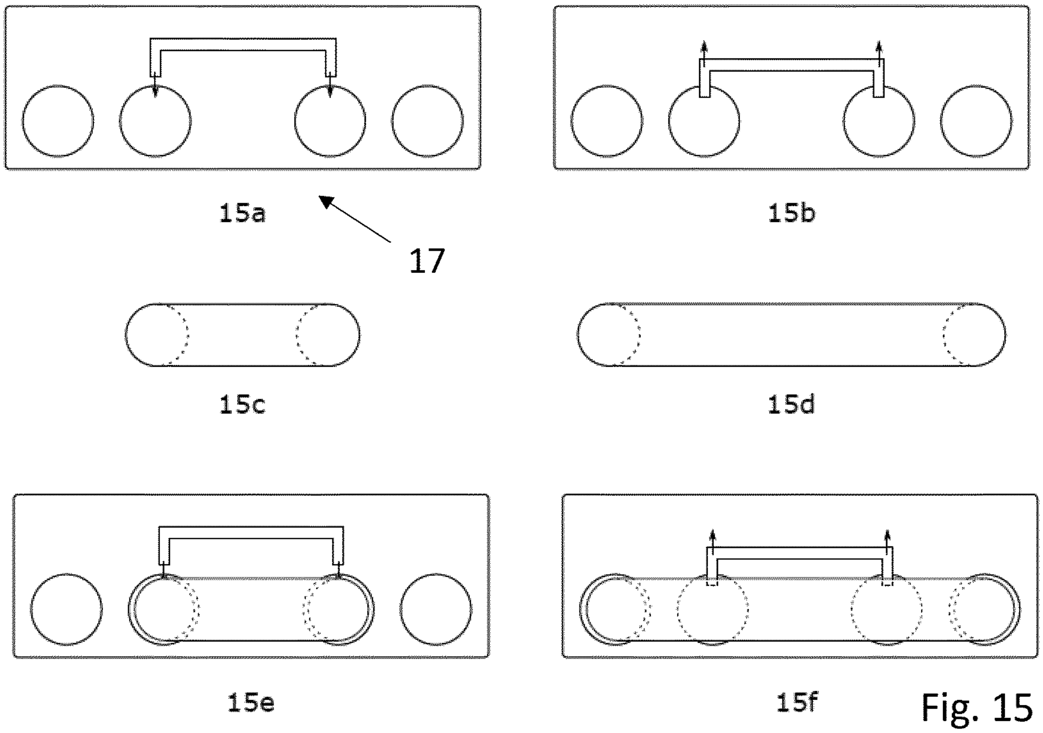

5. The connection region has several first engagement structures (engagement elements). A first blocking means is associated with at least one first engagement structure (engagement element), so that in at least one first configuration of the child receiving device, the at least one first engagement structure (engagement element) has a different cross-section than in at least one second configuration of the child receiving device (cf. FIGS. 13 to 15).

At least one connection device may be provided that is always connectable. For this purpose, the connection device may be designed such that each of the second engagement structures provided (which may also mean only one second engagement structure) is provided for cooperation with at least one first engagement structure (engagement element) of invariable cross-section (cf. FIGS. 14*c* and 14*f* as well as 15*d* and 15*f*) and/or is designed such that it can be brought into engagement with at least one first engagement structure (engagement element) of variable cross-section both in the first configuration of the main body as well as in the second configuration of the main body (cf. FIGS. 13*d*, 13*f* and 13*g*).

At least one other connection device may be provided which is connectable only in the first configuration of the child receiving device. To this end, the other connection device may be designed such that it has at least one engagement structure which is provided for cooperation with a first engagement structure (engagement element) of variable cross-section and can be engaged with the latter only in the first configuration of the main body (cf. FIGS. 13*c* and 13*e*).

At least one other connection device can be provided which is connectable in the second configuration of the child receiving device, only. To this end, the still other connection device may be configured such that it has at least one engagement structure provided for cooperation with a first engagement structure (engagement element) of variable cross-section and can be engaged with the latter only in the second configuration of the main body (for which, for example, further engagement structures may be added to the mechanism shown in FIG. 12).

The first engagement structures can be specifically formed as an opening (such as a through hole, blind hole, groove and/or a comparable structure, possibly also as a combination of said structures). The second engagement structures can be formed as counterparts of the openings (such as an arm, bar, protrusion, rail and/or a comparable structure, possibly also as a combination of said structures).

The connection region or the openings can extend to the outer sides of the main body so that the connection devices or their arms can be attached by pushing them in from the side. However, it would also be conceivable for the openings to extend towards or away from the front of the child receiving device, so that the respective connection device can be attached by pushing in from the front or rear.

Further embodiments will be apparent from the dependent claims.

Figure 2:
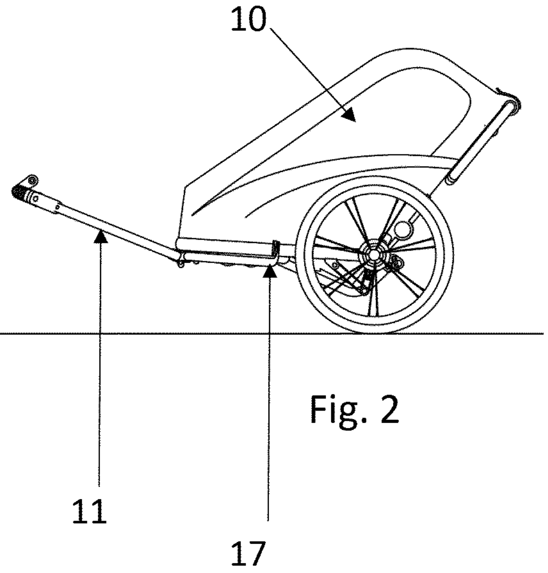
Figure 3:
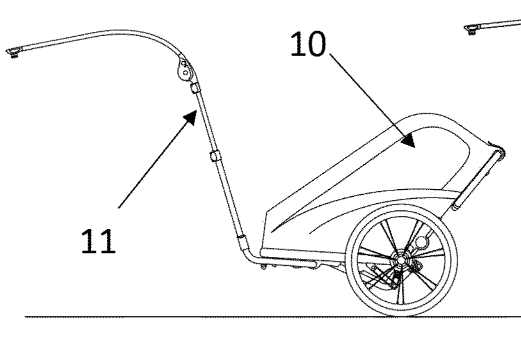
Figure 4:
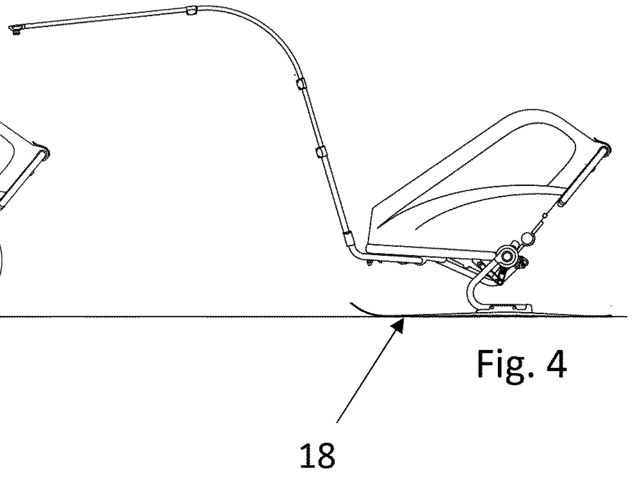
Figure 5:
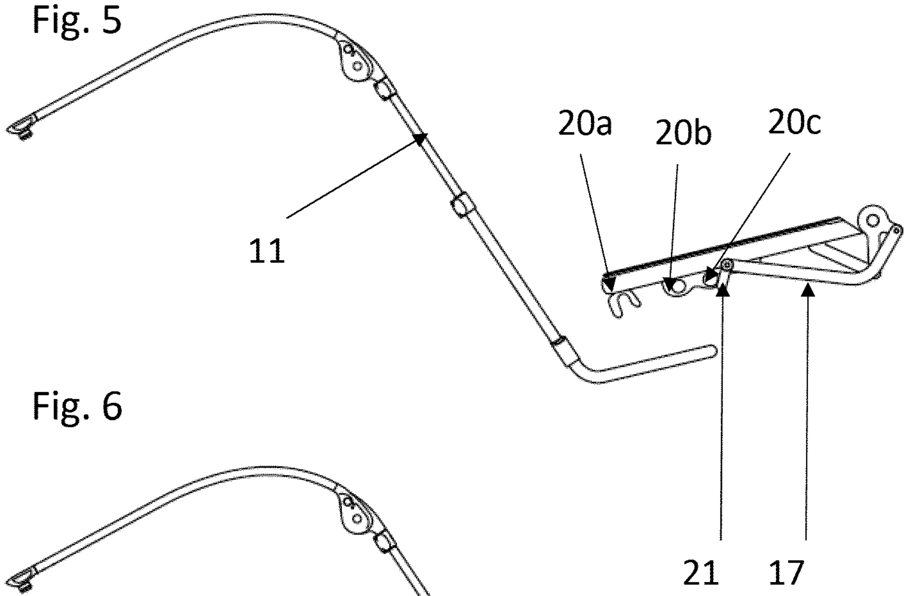
Figure 6:
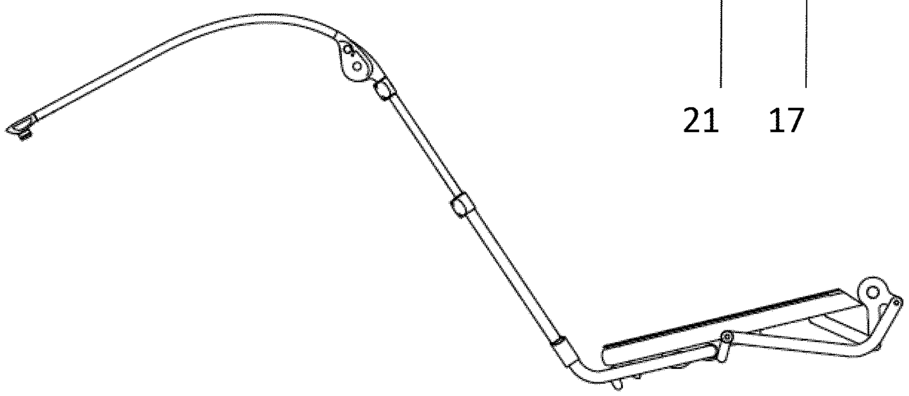
Figure 7:
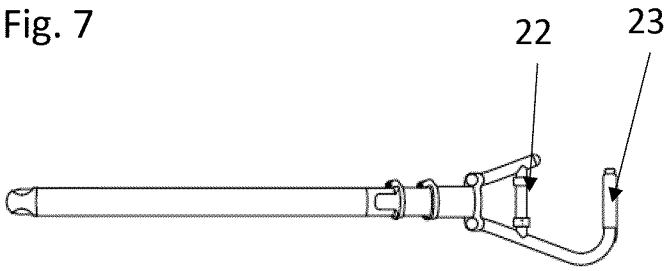
Figure 8:
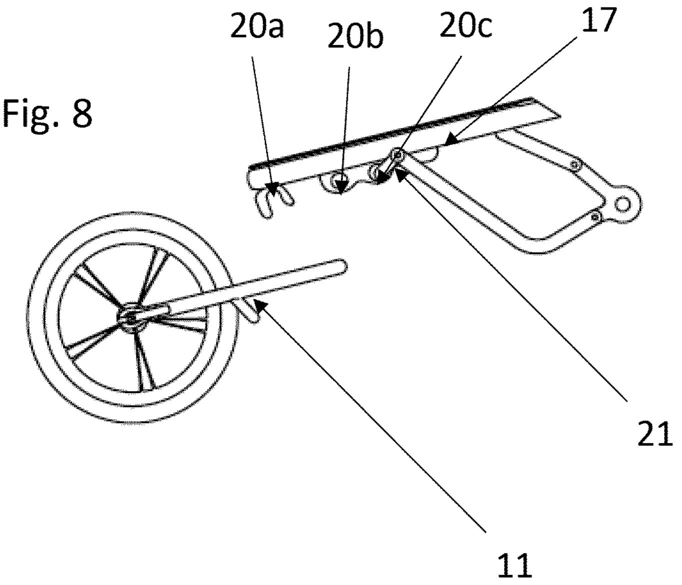
Figure 9:
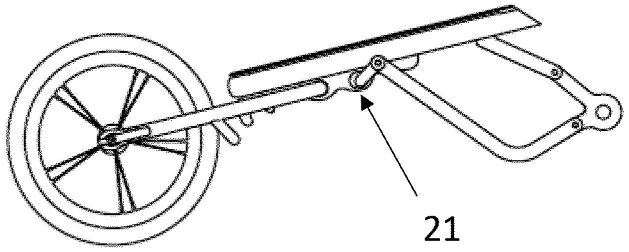
Figure 10:
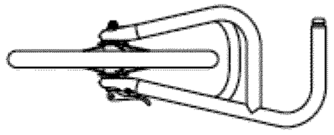

In the following, the invention will be described by means of execution examples which will be explained in more detail with reference to the figures. Hereby show:

FIG. 1 a side view of a child receiving device according to the invention with a connection device in the form of a front wheel fork;

FIG. 2 the child receiving device according to FIG. 1 in a different configuration and with a further connection device in the form of a pull bar;

FIG. 3 the child receiving device based on FIGS. 1 and 2, with a pull bar differing from FIG. 2;

FIG. 4 the child receiving device based on FIGS. 1 to 3 configured as a ski trailer;

FIG. 5 a connection region of the child receiving device with a pull bar;

FIG. 6 a representation analogous to FIG. 5 in the connected state;

FIG. 7 the connection device according to FIGS. 5 and 6 in a view from above;

FIG. 8 the connection region of the child receiving device with a front wheel fork;

FIG. 9 a representation analogous to FIG. 8 in the connected state;

FIG. 10 the connection device from FIGS. 8 and 9 in a view from above;

FIGS. 11*a*-11*g* and

FIGS. 12*a*-12*f* different solutions for a connection region with corresponding connection structures;

FIGS. 13*a*-13*g* different solutions for a connection region with corresponding connection structures;

FIGS. 14*a*-14*h* different solutions for a connection region with corresponding connection structures;

FIGS. 15*a*-15*f* different solutions for a connection region with corresponding connection structures.

In the following description, the same reference numerals are used for equal and equally acting parts.

FIG. 1 shows a child transport device 9, comprising a child receiving device 10 as well as a connection device 11, which can be pushed by a pusher 12 and forms a pram.

The connection device 11 according to FIG. 1 is designed as a front wheel fork. In this respect, the connection device 11 comprises a front wheel 13. The child receiving device 10 has two rear wheels 14 (only one of which is visible in the side view), a cabin 15 as well as a frame 16 which can be changed via at least one joint 16*a*. In the cabin 15 at least one (i.e. exactly one or more than one), or at least two (i.e. exactly two or more than two), child(ren) can be accommodated.

FIG. 2 shows the child receiving device 10 in a different configuration from FIG. 1. Among other things, the front wheel fork has been replaced here by a different connection device 11 in the form of a pull bar or trailer hitch compared to FIG. 1. As can be seen, the configuration of the child receiving device according to FIG. 2 further differs from the configuration according to FIG. 1 in that frame 16 or cabin 15 (in particular in a rear region) are lower and (which is optional) the pusher 12 is folded down or towards a main body of the child receiving device 10 (so that it is not in the way) compared to FIG. 1.

Specifically, the respective connection device 11 according to FIGS. 1 and 2 is connected to (or attached to) the child receiving device 10 at a connection region 17. The connection region 17 is part of the child receiving device 10.

FIG. 3 shows the child receiving device 10 in the configuration according to FIG. 2, whereby the child receiving device 10, in contrast to FIG. 2, is connected to another pull transmission device (pull bar) as the connection device 11. This pull transmission device can be attached to a running person, for example.

FIG. 4 shows the child receiving device 10 basically in the configuration according to FIGS. 2 and 3, but in contrast to FIGS. 2 and 3, skids (or skis) 18 are attached instead of the rear wheels 14.

FIG. 5 shows the connection region 17 of the child receiving device 10 (which is not shown) as well as a connection device 11 in the form of a pull bar.

FIG. 6 shows the connection region 17 as well as the connection device 11 in a state connected with each other. FIG. 7 shows the connection device 11 (pull bar) according to FIGS. 5 and 6 in a view from above.

The connection region 17 according to FIGS. 5-7 has a first engagement structure 20*a*, a second engagement structure 20*b* and a third engagement structure 20*c*. The engagement structure 20*a* has a U-shaped receptacle. The engagement structures 20*b*, 20*c* are optionally formed as holes. Furthermore, the connection region 17 has a blocking device (blocking means, preferably cover plate or cover plate section) 21, which (as explained in more detail with reference to FIGS. 8-10 below) can be brought into alignment with the engagement structure 20*c*.

The connection device 11 in turn comprises a bar (or other engagement structure) 22 as well as a bar (or other engagement structure) 23. The bar 22 may be brought into engagement with the engagement structure 20*a*. When this is the case, the bar 23 may be engaged only with the engagement structure 20*c*, but not with the engagement structure 20*b*.

In particular, it may be provided that the bar 23 is first inserted into the engagement structure 20*c* with the bar 22 still initially spaced from the engagement structure 20*a*. The connection device 11 can then be rotated upwards so that the bar 22 rotates into the engagement structure 20*a* and is locked there by a locking mechanism (not shown).

This means (cf. FIGS. 8-9) that the connection device 11 (in the form of the pull bar) according to FIGS. 5-7 is not connectable to (or attachable to) the child receiving device 10 in a deviating configuration of the child receiving device 10, in which (as a result of the change in configuration) the blocking device 21 is in cover with the engagement structure 20*c*.

Such a configuration is schematically shown with reference to FIGS. 8-10. Specifically, this configuration may, for example, differ from the configuration according to FIGS. 5-7 in that the centre of gravity of the child receiving device 10 is higher in this case. As can be seen in FIG. 8, the blocking device 21 now blocks the engagement structure (opening or hole) 20*c*, but not the engagement structure 20*b*. The connection device 11 in the form of a front wheel fork, which can be seen in FIGS. 8 and 9, has bars (or other engagement structures) 22, 23 in principle analogous to the connecting device (pull bar) 11 according to FIGS. 5-7. Again, the bar 22 is engageable with the engagement structure 20*a* of the connection region 17. However, in contrast to FIGS. 5-7, the bar 23 of the connection device 11 according to FIG. 8-10 is closer to the bar 22, so that the latter can only be brought into the engagement structure 20*b* (which is also not blocked in FIG. 8-10). It can be seen that the connection device 11 (front wheel fork) according to FIGS. 8-10 would also be engageable with the connection region 17 in the configurations of the child receiving device 10 according to FIGS. 5-7.

In particular, it may also be provided here that at first the bar 23 is inserted into the engagement structure 20*b*, with the bar 22 still initially spaced from the engagement structure 20*a*. The connection device 11 can then be rotated upwards so that the bar 22 rotates into the engagement structure 20*a* and is locked there by a locking mechanism (not shown).

FIG. 11*a* shows (highly schematic) a connection region with an opening and a first blocking means, wherein the first blocking means is in a first position in which it does not influence the cross-section of the opening.

FIG. 11*b* shows the connection region with the opening and the first blocking means of FIG. 11*a*, whereby the first blocking means is now in a second position in which it reduces the cross-section of the opening.

FIG. 11*c* shows a second engagement structure (engagement element) of a connection device, the cross-section of the engagement structure (engagement element) being formed such that it can only engage the opening when the first blocking means according to FIG. 11*a* is in its first position.

FIG. 11*d* shows another second engagement structure (engagement element) of another connection device, the cross-section of this engagement structure (engagement element) being formed such that it can engage the opening regardless of the position of the first blocking means.

FIG. 11*e* shows the second engagement structure (engagement element) of FIG. 11*c* in engagement with the opening, whereby according to FIG. 11*a* the first blocking means is in its first position.

FIG. 11*f* shows the other second engagement structure (engagement element) of FIG. 11*d* in engagement with the opening, whereby according to FIG. 11*b* the first blocking means is in its second position.

FIG. 11g shows the other second engagement structure (engagement element) of FIG. 11*d* in engagement with the opening, whereby according to FIG. 11*a* the first blocking means is in its first position.

FIG. 12*a* shows a connection region with an opening and a first blocking means, wherein the first blocking means is in a first position.

FIG. 12*b* shows the connection region with the opening and the first blocking means of FIG. 12*a*, whereby the first blocking means now in a second position in which it changes the cross-section of the opening.

FIG. 12*c* shows a second engagement structure (engagement element) of a connection device, whereby the cross-section of the engagement structure (engagement element) is formed such that it can only engage the opening when the first blocking means according to FIG. 12*a* is in its first position.

FIG. 12*d* shows another second engagement structure (engagement element) of another connection device, whereby the cross-section of this engagement structure (engagement element) is formed such that it can only engage the opening when the first blocking means according to FIG. 12*b* is in its second position.

FIG. 12*e* shows the second engagement structure (engagement element) of FIG. 12*c* in engagement with the opening, whereby according to FIG. 12*a* the first blocking means is in its first position.

FIG. 12*f* shows the other second engagement structure (engagement element) of FIG. 12*d* in engagement with the opening, whereby according to FIG. 12*b* the first blocking means is in its second position.

FIG. 13*a* shows (highly schematic) a connection region 17 with two openings and a first blocking means, whereby the first blocking means is in a first position in which it does not influence the cross-section of the openings.

FIG. 13*b* shows the connection region with the openings and the first blocking means of FIG. 13*a*, whereby the first blocking means is now in a second position in which it reduces the cross-section of one of the openings.

FIG. 13*c* shows two interconnected second engaging structures (engaging elements) of a connection device, whereby the cross-section of the engaging structures (engaging elements) is formed such that they can only engage the openings when the first blocking means according to FIG. 13*a* is in its first position.

FIG. 13*d* shows two other second interconnected engagement structures (engagement elements) of another connector, whereby the cross-section of these engagement structures (engagement element) is formed such that they can engage the opening regardless of the position of the first blocking means.

FIG. 13*e* shows the second engagement structures (engagement elements) of FIG. 13*c* in engagement with the openings, whereby according to FIG. 13*a* the first blocking means is in its first position.

FIG. 13*f* shows the other second engagement structures (engagement elements) of FIG. 13*d* in engagement with the openings, whereby according to FIG. 13*b* the first blocking means is in its second position.

FIG. 13*g* shows the other second engagement structures (engagement elements) of FIG. 13*d* in engagement with the openings, whereby according to FIG. 13*a* the first blocking means is in its first position.

FIG. 14*a* shows (highly schematic) a connection region 17 with three openings and a first blocking means, whereby the first blocking means is in a first position in which it does not influence the cross-section of the openings.

FIG. 14*b* shows the connection region with the openings and the first blocking means of FIG. 14*a*, whereby the first blocking means is now in a second position in which it reduces the cross-section of one of the openings.

FIG. 14*c* shows two interconnected second engagement structures (engagement elements) of a connection device, whereby the spacing of the engagement structures (engagement elements) is formed such that they can engage the openings regardless of the position of the first blocking means.

FIG. 14*d* shows two other second interconnected engagement structures (engagement elements) of another connection device, whereby the spacing and cross-section of these engagement structures (engagement elements) is formed such that they can only engage the openings when the first blocking means according to FIG. 14*a* is in its first position.

FIG. 14*e* shows three interconnected second engagement structures (engagement elements) of yet another connector, whereby the spacing and cross-sections of these engagement structures (engagement elements) is formed such that they can only engage the openings when the first blocking means according to FIG. 14*a* is in its first position.

FIG. 14*f* shows the second engagement structures (engagement elements) of FIG. 14*c* in engagement with two of the openings, whereby according to FIG. 14*a* the first blocking means is in its first position.

FIG. 14*g* shows the other two second engagement structures (engagement elements) of FIG. 14*d* in engagement with two of the openings, whereby according to FIG. 14*b* the first blocking means is in its second position.

FIG. 14*h* shows the second engagement structures (engagement elements) of FIG. 14*c* in engagement with the openings, whereby according to FIG. 13*b* the first blocking means is in its second position.

FIG. 15*a* shows (highly schematic) a connection region 17 with four openings and a first blocking means, whereby the first blocking means is in a first position in which it does not influence the cross-section of the openings.

FIG. 15*b* shows the connection region with the openings and the first blocking means of FIG. 15*a*, whereby the first blocking means is now in a second position in which it reduces the cross-section of two openings.

FIG. 15*c* shows two interconnected second engaging structures (engaging elements) of a connection device, whereby the spacing of the engaging structures (engaging elements) is formed such that they can only engage the openings when the first blocking means according to FIG. 13*a* is in its first position.

FIG. 15*d* shows two other interconnected second engagement structures (engagement elements) of another connection device, whereby spacing and cross-section of these engagement structures (engagement elements) is formed such that they can engage the opening regardless of the position of the first blocking means.

FIG. 15*e* shows the second engagement structures (engagement elements) of FIG. 15*c* in engagement with two of the openings, whereby according to FIG. 15*a* the first blocking means is in its first position.

FIG. 15*f* shows the other second engagement structures (engagement elements) of FIG. 15*d* in engagement with the other two openings, whereby according to FIG. 15*b* the first blocking means is in its second position.

At this point, it should be noted that all of the parts described above, taken individually and in any combination, in particular the details shown in the drawings, are claimed to be essential to the invention. Modifications thereof are familiar to those skilled in the art.

REFERENCE SIGNS

10 child receiving device
11 connection device
12 pusher
13 front wheel
14 rear wheel
15 cabin
16 frame
17 connection region
18 skid (ski)
20*a*, 20*b*, 20*c* engagement structure (connection structure)
22 bar (engagement structure, counter connection structure)
23 bar (engagement structure, counter connection structure)

The invention claimed is:

1. A child transport device system, pram or child trailer or jogger system, for use in different modes, for pushing or pulling transport of at least one child, comprising:

a child receiving device for receiving the at least one child, which is adjustable in at least two configurations; and at least one connection device, which is connectable to the child receiving device in at least one of the at least two configurations of the child receiving device and is not connectable or is connectable only in an impeded manner to the child receiving device in at least one further configuration of the at least two configurations of the child receiving device, wherein the child receiving device comprises an adjustable blocking device configured for preventing or impeding connection of the at least one connection device in at least one configuration, which modifies at least one connection structure of the child receiving device such that the at least one connection device is not connectable or allows a blocking independent of a connection structure.

2. The child transport device system according to claim 1, wherein, in one of the at least two configurations in which the at least one connection device is not connectable or is connectable only in an impeded manner to the child receiving device, at least one further connection device is connectable to the child receiving device.

3. The child transport device system according to claim 1, wherein a transfer from the at least one of the at least two configurations to the at least one further configuration is not possible when the at least one connection device is connected.

4. The child transport device system according to claim 1, wherein at least one connection structure of the child receiving device, to which the at least one connection device is connectable, is arranged in a front or lower region of the child receiving device.

5. The child transport device system according to claim 1, wherein the child receiving device comprises at least one ground contact device including at least one wheel, at least one rear wheel, or a skid, or the at least one connection device comprises at least one ground contact device including at least one wheel, at least one front wheel, or at least one skid, or a front wheel fork.

6. The child transport device system according to claim 1, wherein the at least one connection device comprises a pull transmission device including a pull bar, or is formed by such a device.

7. The child transport device system according to claim 1, wherein the at least two configurations are distinguished by:

a height of the child receiving device being a difference in a height of a pusher or a component thereof or a height of at least one wheel axle, or a horizontal extension differing with regard to a length or a width and a pusher configuration of a pusher or pusher component, wherein two pusher configurations preferably by an angle of the pusher relative to a main body of the child receiving device or an angle of two components of the pusher relative to each other or by a pusher length or pusher height.

8. The child transport device system according to claim 1, wherein at least one connection structure of the child receiving device is configured for connecting completely or partially a first connection device of theat least one connection device to a second connection device of theat least one connection device.

9. The child transport device system according to claim 1, wherein the child receiving device comprises:

at least one seating or reclining device or at least one cabin for receiving at least one child or at least one frame or chassis which is adjustable for setting different configurations.

10. The child transport device system according to claim 1, wherein the system is configurable for at least two different applications, which differ in that the system is configured either for pulling by a bicycle, or harness, or for pushing, by a walking person.

11. The child transport device system according to claim 1, wherein the at least one connection device is at least two connection devices that are different in that at least one connection device has at least one ground contact device including at least one wheel, front wheel, or at least one skid or has at least one fastening device for fastening such a ground contact device and at least a second connection device does not, or by a number or shaping or positioning of connection counter-structures for connection to at least one connection structure of the child receiving device, or by a material or a length or a height or a width or a weight.

12. The child transport device system according to claim 1, wherein the at least one connection device comprises at least one connection counter-structure for connection to at least one connection structure of the child receiving device.

13. The child transport device system according to claim 1, wherein a connection of the at least one connection device to the child receiving device is lockable such that the connection can only be released by actuating a locking device via an actuating device comprising a button, knob, pusher or lever.

14. A method of configuring a child transport device using the child transport device system according to claim 1, wherein a single one or a sub-group of the at least one connection device is selected and connected to the child receiving device.

15. A child transport device system, pram or child trailer or jogger system, for use in different modes, for pushing or pulling transport of at least one child, comprising:

a child receiving device for receiving the at least one child, which is adjustable in at least two configurations;

at least one connection device, which is connectable to the child receiving device in at least one of the at least two configurations of the child receiving device and is not connectable or is connectable only in an impeded manner to the child receiving device in at least one further configuration of the at least two configurations of the child receiving device; and wherein the child receiving device comprises a blocking device that in the at least one of the at least two configurations of the child receiving device prevents or impedes connection of a first of the at least one connection device but allows connection of a second of the at least one connection device, and in at least one other of the at least two configurations prevents or impedes connection of both the first of the at least one connection device and the second of the at least one connection device.

16. A child transport device system, pram or child trailer or jogger system, for use in different modes, for pushing or pulling transport of at least one child, comprising:

a child receiving device for receiving the at least one child, which is adjustable in at least a first configuration and a second configuration;

at least a first connection device and a second connection device, wherein the first connection device is connectable to the child receiving device the first configuration of the child receiving device and is not connectable or is connectable only in an impeded manner to the child receiving device in the second configuration of the child receiving device; and a blocking device that, in the second configuration of the child receiving device, prevents or impedes connection of the first connection device but allows connection of the second connection device, and in the first configuration of the child receiving device, does not prevent or impede the connection of either the first connection device or the second connection device.

* * * * *